June 23, 1953        A. J. FREI        2,642,727

FREEZING PAN

Filed June 11, 1952                         2 Sheets-Sheet 1

INVENTOR.
Arthur J. Frei
BY
Willits, Hardman & Fehr.

June 23, 1953      A. J. FREI      2,642,727
FREEZING PAN
Filed June 11, 1952      2 Sheets-Sheet 2
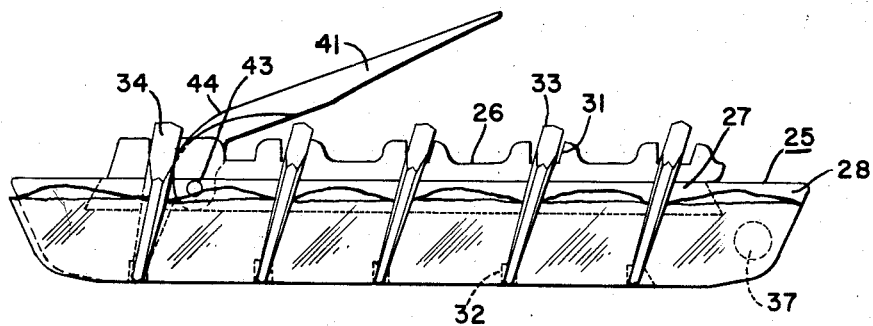
Fig. 3
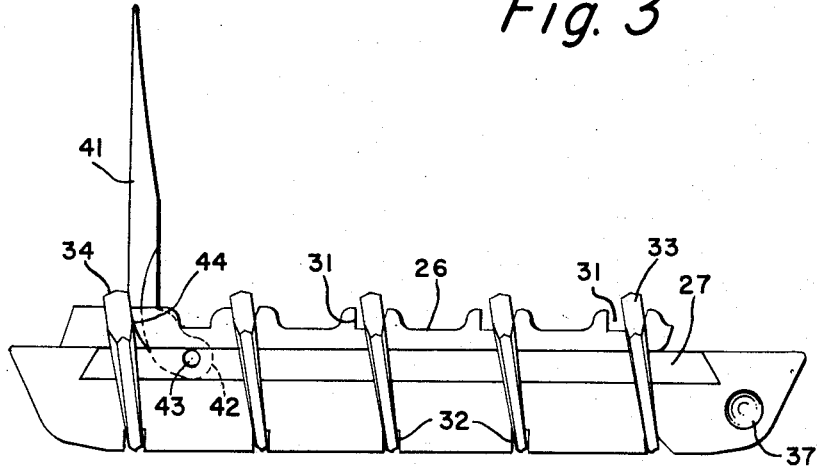
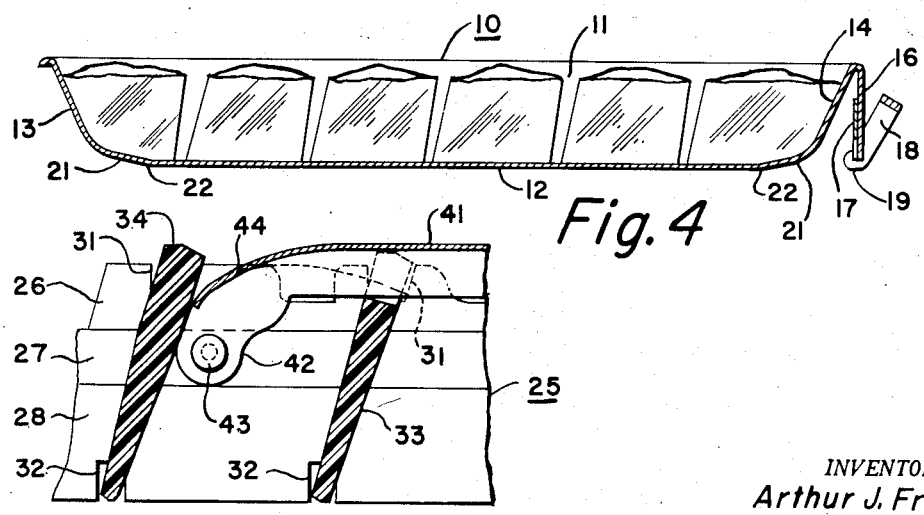
Fig. 4
Fig. 5
*INVENTOR.*
Arthur J. Frei
BY
*Willits, Hardman & Fehr.*

Patented June 23, 1953

2,642,727

UNITED STATES PATENT OFFICE 2,642,727

FREEZING PAN

Arthur J. Frei, Dayton, Ohio, assignor to General Motors Corporation, Detroit, Mich., a corporation of Delaware Application June 11, 1952, Serial No. 292,897

6 Claims. (Cl. 62—108.5)

This invention relates to freezing devices and more particularly to grids used in trays of household refrigerators.

Others have suggested the use of grids for dividing the interior of a freezing tray into a plurality of ice block forming compartments, which grid walls or at least some of the walls have been constructed of a non-metallic molded material of the character which inherently possesses the property of repelling water. Polystyrene has been obtainable in powdered form, and the powdered styrene has been heated in a vessel to between 180° and 300° F. to cause melting thereof whereupon it is forced under pressure into suitable molds. This molten material is permitted to cool and solidifies in the mold and is then removed therefrom in the form of a substantially inflexible unitary polystyrene glass-like piece of a desired shape to provide grid walls having smooth water repellent surfaces. While the use of polystyrene may be preferred, because of its adaptation to rapid production, other materials such for example as polyvinyl-acetate or polyvinyl-chloride, also having the inherent property of repelling water, are suitable for the purpose described. Such molded plastic grid walls are brittle and it has been difficult to reinforce them in such a manner that they will withstand the application of force thereto by levers, arms and the like of mechanisms employed to move the walls of a grid structure for causing ice blocks to be mechanically released therefrom. Others have located metal inserts in molded plastic grid walls particularly at the point of application of force thereto. This is troublesome and expensive in that it requires the use of molds of complicated construction to insure that the metal inserts will be maintained in proper position within the molds during the act of forcing the molten plastic material under pressure into the cavities of the molds. Furthermore, if the metal inserts are not entirely embedded in the plastic material, the exposed portions of the inserts become rusted and soon deteriorate, thus weakening the grid walls at the very point where they should be maintained reinforced. I therefore contemplate the provision of an ice tray grid which has a plurality of molded plastic wall members or partitions and wherein forces applied to the partitions, to move them, act at several points therealong or is distributed over a substantial area thereof to avoid the necessity of embedding metal inserts therein. In order to accomplish this, my ice tray grid is constructed of such design that only a minimum of metal parts are employed as is necessary to take the brunt of the reactive forces applied to the grid walls, thus permitting more walls or portions thereof to be formed of polystyrene or the like material.

An object of my invention is to provide an improved grid structure for use in ice trays, which structure facilitates the removal of ice blocks from the grid walls.

Another object of my invention is to provide a grid structure for an ice tray having certain walls thereof formed of molded plastic material and certain other portions thereof formed of metal and constructed so that the metal portions of the grid take the main shocks or stresses of a mechanism employed to move walls of the grid relative to one another.

A further object of my invention is to construct a grid for an ice tray having several sectional longitudinal partitions and a plurality of molded plastic partitions movably interlocked therewith and extending transversely thereto with a lever directly engageable with one of the transverse partitions for applying force thereto to move the same and wherein movement of this one transverse partition moves a section of the longitudinal sectional partitions for shifting all other of the plurality of transverse partitions relative to another section of the sectional longitudinal partitions.

A still further and more specific object of my invention is to provide a grid for an ice tray constructed mostly of molded plastic partitions wherein a plurality of longitudinal sectional partitions permit force applied by a lever directly to one of a plurality of molded plastic transverse partitions to act on the other of the plurality of transverse partitions at separate spaced apart points thereacross.

Further objects and advantages of the present invention will be apparent from the following description, reference being had to the accompanying drawings wherein a preferred form of the invention is clearly shown.

In the drawings:

Figure 3 is a view similar to Figure 2 showing the grid together with ice blocks frozen therein removed from the tray;

Figure 4 is a view showing the grid walls moved relative to one another and ice blocks removed from the grid structure and received in the tray;

Figure 5 is an enlarged fragmentary vertical sectional view taken on the line 5—5 of Figure 1 showing one leg of a lever pivotally attached to one of the sections of a sectional longitudinal partition of the grid structure;

Figure 1:
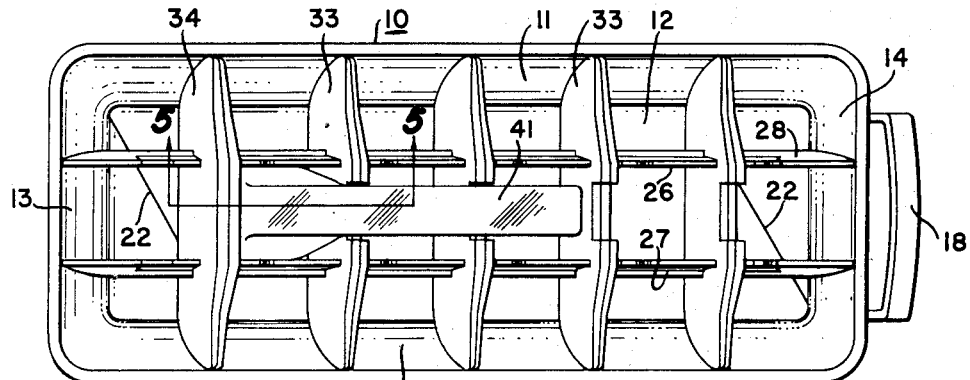
Figure 1 is a top view of an ice tray having a grid constructed in accordance with the present invention disposed therein.
Figure 2:
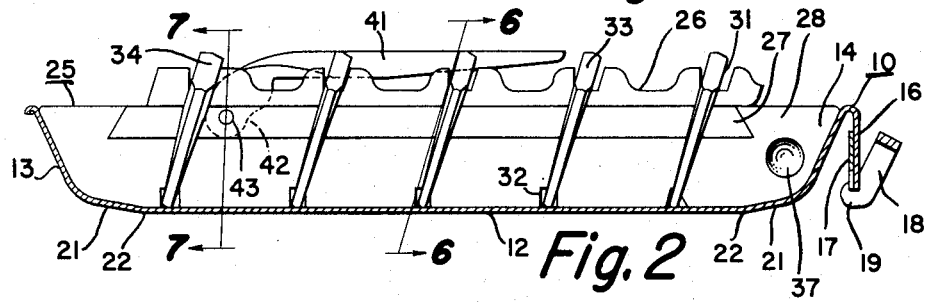
Figure 2 is a side view of the device disclosed in Figure 1 with the tray thereof shown in section.

Referring to the drawings for illustrating the present invention, there is shown in Figure 1 a freezing device including a tray having a unitary grid structure disposed therein. The tray is generally represented by the reference character 10 and this tray has side walls 11, a bottom wall 12 and opposed end walls 13 and 14. The tray's side and end walls 11, 13 and 14 respectively converge outwardly toward the top of tray 10, and these walls have their upper edge rolled over to form a rim around the top of the tray. A portion of tray 10 is extended downwardly from the tray rim, as at 16 (see Figure 2) at the front thereof, and provides a mounting for a metal piece 17 which has a handle 18 pivotally secured thereto in any suitable or conventional manner. Handle 18 facilitates placing of tray 10 in or on a cooling element or an evaporator of a refrigerating system and a cam 19 thereon serves, upon actuating handle 18, to break an ice bond between the tray and its support to permit removal of the tray and its frozen contents from the evaporator in the well-known manner. It will be noted that tray 10 has a portion of its bottom 12 near each end thereof raised, as at 21, at an angle relative to its other flat portion. These raised or angled bottom wall portions 21 near the ends of tray 10 provide shoulders or fulcrum lines 22 which extend transversely across the tray bottom at an angle relative to the end portions of the tray. The bent over rim, at corners of tray 10 above the widest part of the raised or angled tray bottom portions 21, is adapted to be pressed for a purpose to be presently described.

Figure 6:
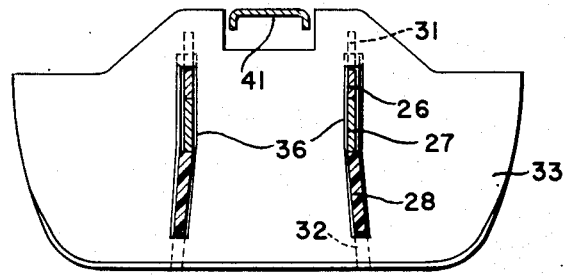
Figure 6 is an enlarged vertical sectional view taken on the line 6—6 of Figure 2 showing the interlocking of one transverse partition with sections of two sectional longitudinal partitions.
Figure 7:
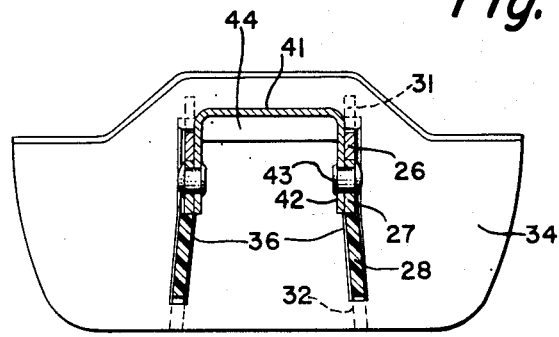
Figure 7 is an enlarged vertical sectional view taken on the line 7—7 of Figure 2 showing the mounting of a lever on the grid structure.

The unitary grid structure generally represented by the reference character 25, within tray 10 and constituting the improved grid of the present invention, is removably disposed in the tray and divides the interior thereof into three longitudinal rows of open top ice block cells or compartments. Grid structure 25 comprises two spaced apart longitudinal sectional walls or partitions each of which includes an upper metal section or member 26, a lower metal section or intermediate member 27 and a bottom section or member 28. Bottom member or section 28 is formed of molded plastic material of the type hereinbefore described and is cut out along the top thereof between its ends to receive the lower metal section or intermediate member 27. The sections 26, 27 and 28 of each longitudinal sectional partition are disposed one above the other with the central section or intermediate member 27 fitted into the bottom member 28 and held thereby against lengthwise movement relative thereto. By disposing the sections or members 26, 27 and 28 as stated, they form complementary portions or sections of the two single thickness upright longitudinal partitions. The upper section or member 26 of each longitudinal partition is provided with a plurality of longitudinally spaced apart notches 31. The bottom molded plastic section or member 28 is provided with a plurality of notches 32 extending upwardly from its lower edge. A plurality of separate transverse partitions 33, the one 34 of which may be made thicker than the others for a purpose to become apparent hereinafter, are assembled to the longitudinal partitions in any suitable or conventional manner, for movement relative thereto and particularly to at least one section thereof. These transverse walls or partitions 33 and 34 are provided with vertically elongated openings 36 through which the members or sections 26, 27 and 28 of the longitudinal partitions extend (see Figures 6 and 7). That portion above and below the openings 36 of transverse partitions 33 and 34 fit in the notches 31 and 32 respectively and are interlocked with the longitudinal partitions for movement relative thereto. It will be noted that the notches 31 in the upper section or member 26 are progressively wider from one end to the other end of section 26. The notches 32 in the bottom member 28 are substantially uniform in width and are evenly spaced from one another. It will also be noted that the openings 36 in the transverse partitions 33 and 34 have an upper vertical portion receiving the two metal sections or members 26 and 27 and a lower angled or outwardly diverging portion receiving the molded plastic bottom members 28. Thus the bottom portions of ice block compartments intermediate the sectional longitudinal partitions are wider than the upper portions thereof to provide a relief for facilitating the removal of ice blocks formed between the longitudinal partitions. Lower member 28 of each longitudinal partition is also provided with a circular depression 37 in one face thereof which facilitates removal of ice blocks at the one end of the grid as will be hereinafter described.

A lever 41, located between the two sectional longitudinal partitions, has a pair of legs 42, each of which is pivotally secured, by a suitable rivet or the like 43 (see Figures 5 and 7), to the stationary section, comprising members 27 and 28, of each of the longitudinal partitions. This lever 41 is provided with a curved camming surface 44 (see Figure 7) adapted, upon movement of lever 41, about its pivotal mounting 43, to directly engage and apply force to the one transverse molded plastic partition 34. The arrangement of lever 41 and section 26 relative to the lower section of the grid is such that the lever moves or tilts transverse partion 34 and the tilting movement of this partition causes the same to engage and move the upper section or member 26 of the structure lengthwise relative to the stationary lower section thereof, comprising members 27 and 28. Thus, lever 41 is unattached to member 26 and acts solely through the one transverse partition 34 to move member 26 which in turn engages and moves or tilts all other of the transverse partitions 33 relative to the lower section of the longitudinal sectional partitions. In this respect my structure distinguishes itself from former grid structures wherein the lever was attached to both sections of the longitudinal wall and acted directly therebetween to apply force to the movable upper longitudinal wall member. The camming surface 44 on lever 41 extends a substantial distance along the space intermediate the sectional longitudinal partitions and contacts transverse partition 34 over a wide surface of its one side to thereby distribute the force applied thereto over a substantial area thereof. This distribution of the force applied by lever 41, particularly upon initial movement thereof (see Figure 3), to transverse partition 34 together with the fact that the upper section 26 of each longitudinal partition engages the remainder of the transverse partitions 33 at two spaced points therealong renders the use of embedded metal reinforcing inserts in the molded plastic transverse partitions unnecessary. This is particularly true since the transverse partitions 33 are picked up one by one in succession and moved relative to the lower section of the two sectional longitudinal partitions. The force applied by lever 41 is minimized since it is necessary to move only one transverse wall or partition at a time, by virtue of the difference in the width of slots 31 relative to one another.

After water has been frozen in tray 10 in the form of ice blocks in the compartments, provided by partitions of the grid 24 in the tray, it now becomes desirable to remove the freezing device from the evaporator of a household refrigerator cabinet. The handle 18 is manipulated to cause the cam surface 19 thereon to bear against the tray supporting surface and break the bond between the tray 10 and its support. The device is then removed from the refrigerator and placed on a flat table top or the like whereupon force is applied by the hands at the two top corners of the tray remote from the shoulders or fulcrum lines 22. Since tray 10 is formed of relatively thin metal, it is somewhat flexible and the downward force applied to its ends is transmitted to the fulcrum lines or shoulders 22 and causes flexure or twisting of the tray. This twisting of tray 10 breaks the bond between the ice therein and the inner surfaces of the tray walls. The grid structure 25 together with ice blocks adhering thereto can then be readily raised relative to and removed from tray 10 as a unit to permit harvesting of ice blocks from the grid structure. After removal of the grid 25 together with ice blocks bonded thereto from tray 10, various walls or partitions of the grid structure can then be moved relative to one another to release ice blocks from the grid. In Figure 3 of the drawing, I show the lever as already having been initially moved to break the bond between the end ice blocks and the grid walls. In such position of lever 41, its relatively wide camming surface 44 has directly engaged and applied force to the one end transverse partition 34 to cause an initial tilting movement thereof. Further movement of lever 41, in a counterclockwise direction, from that shown in Figure 3 of the drawings causes the one transverse partition 34 to engage a wall of slot 31 provided in the sections or members 26, into which partition 34 fits, and move the upper sections 26 of each of the longitudinal sectional partitions. The lever 41 instead of reacting between the stationary metal sections or members 27 of the two longitudinal partitions and the movable upper sections or members 26 thereof acts directly against the enlarged or thickened transverse partition 34 over a relatively wide surface area of its side. The bond between ice blocks on the one side of partition 34 and portions of the sectional longitudinal partitions having been broken causes further movement of partition 34 to move the upper metal member or bar 26 and all other of the transverse partitions 33 one at a time in succession, by virtue of the progressively widened slots 31, as the lever 41 is raised to a substantially vertical position as shown in Figure 4 of the drawings. Thus, the lever 41 acts solely through the one transverse partition 34 and metal members 27 to move member or bar 26 for causing movement of the transverse partitions 33 and 34 relative to the lower stationary sections of the longitudinal sectional partitions. All the ice blocks will then have been broken loose from the grid structure 25 and released therefrom. The ice blocks may be received in the emptied tray 10 as shown in Figure 4 or in any other suitable receptacle as is desirable. Depression 37 in the molded plastic section or member 28 cooperates with the swinging movement of the last transverse partition 33 to be moved for camming the ice blocks at the end of the grid, opposite the lever end thereof, outwardly away from the longitudinal partitions to remove the same from the grid structure. The relief afforded by the inclined or angularly diverged disposition of the bottom molded plastic sections 28 permits the ice blocks between the sectional partitions to fall freely from the grid structure.

From the foregoing, it should be apparent that I have provided an improved grid structure for an ice tray wherein more walls or surfaces of partitions of a grid may be constructed of molded plastic material, such as polystyrene, than has heretofore been possible. In my improved grid structure the force required to move certain partitions or sections thereof relative to one another is applied over a large area of one partition and is applied at spaced apart points along other transverse partitions to permit movement thereof without causing molded plastic portions, devoid of internal reinforcing means, of a grid to chip or break. By employing less metal in making the present grid structure, its manufacturing cost is reduced and more surfaces which are inherently water repellent are provided to thereby readily remove ice blocks therefrom with a minimum of force applied to walls or partitions thereof.

In accordance with the provisions of Rule 78a, reference is made to the following prior filed application S. N. 182,499, filed August 31, 1950, entitled Freezing Tray. This prior application is related to my present application in that the novel principle of lever operation to carry out the initial and most difficult bond breaking part of the operation of moving the grid walls is employed herein.

While the form of embodiment of the invention as herein disclosed constitutes a preferred form, it is to be understood that other forms might be adopted as may come within the scope of the claims which follow.

What is claimed is as follows:

1. A grid for an ice tray comprising, a longitudinal sectional partition and a plurality of walls movably interlocked with said partition and extending transversely thereacross in spaced relation to one another, said grid cooperating with the tray to form compartments in which a liquid is to be frozen into ice blocks, said transverse walls normally lying in similar planes inclined from the vertical and adapted to be tilted toward the vertical, said longitudinal partition including a lower member, an upper member and an intermediate metal member, said metal intermediate member being interlocked with said lower member to prevent lengthwise movement thereof relative thereto, said partition being constructed to position the bottom edge of said upper member thereof at or above the horizontal plane of the top of upright walls of the tray to retain said upper member out of contact with liquid in said compartments, a lever pivotally mounted to said metal intermediate member, said lever having a camming surface directly contacting one of said transverse walls at an end of said grid, said lever being unattached to said upper member and acting solely between said one transverse wall and said intermediate metal member of said partition to initiate a tilting movement of said one wall toward the vertical, said upper member of said longitudinal partition having a connection with said one transverse wall and other portions thereof cooperating with and adapted to engage additional transverse walls of the grid, and said upper member being forcibly moved lengthwise relative to other members of said partition by and only after said lever has contacted and moved said one transverse wall through said initial tilting movement thereof for causing said other portions of the upper member to contact each of said additional transverse walls and tilt same toward the vertical.

2. A grid substantially as defined in claim 1 wherein the other portions of the upper member are arranged to progressively engage and tilt the additional transverse walls one after the other in succession toward the vertical.

3. A grid substantially as defined in claim 1 wherein the transverse walls and at least the lower member are formed of substantially inflexible molded plastic material.

4. A grid for an ice tray comprising, spaced apart longitudinal sectional partitions and a plurality of walls movably interlocked with each of said partitions and extending transversely thereacross in spaced relation to one another, said grid cooperating with the tray to form compartments in which a liquid is to be frozen into ice blocks, said transverse walls normally lying in similar planes inclined from the vertical and adapted to be tilted toward the vertical, said longitudinal partitions each including a lower member, an upper member and an intermediate metal member, each of said metal intermediate members being interlocked with one of said lower members to prevent lengthwise movement thereof relative thereto, each of said partitions being constructed to position the bottom edge of said upper member thereof at or above the horizontal plane of the top of upright walls of the tray to retain said upper members out of contact with liquid in said compartments, a lever between said longitudinal partitions and pivotally mounted to each of said intermediate metal members thereof, said lever having a camming surface directly contacting one of said transverse walls at one end of said grid, said lever being unattached to said upper members and acting solely between said one transverse wall and said intermediate metal members of said partitions to initiate a tilting movement of said one wall toward the vertical, said upper members of said longitudinal partitions each having a connection with said one transverse wall and other portions thereof cooperating with and adapted to engage additional transverse walls of the grid, and said upper members each being forcibly moved lengthwise relative to other members of said partitions by and only after said lever has contacted and moved said one transverse wall through said initial tilting movement thereof for causing said other portions of the upper members to contact each of said additional transverse walls and tilt same toward the vertical.

5. A grid substantially as defined in claim 4 wherein the other portions of the upper members are arranged to progressively engage and tilt the additional transverse walls one after the other in succession toward the vertical.

6. A grid substantially as defined in claim 4 wherein the transverse walls and at least the lower member of each longitudinal partition are formed of substantially inflexible molded plastic material.

ARTHUR J. FREI.

References Cited in the file of this patent

UNITED STATES PATENTS

| Number | Name | Date |
|---|---|---|
| 2,260,363 | Carney | Oct. 28, 1941 |
| 2,267,440 | Carney | Dec. 23, 1941 |
| 2,267,441 | Carney | Dec. 23, 1941 |
| 2,622,410 | Roberts | Dec. 23, 1952 |